INVENTOR.
Edgar Gretener,
BY
Pierce, Scheffler & Parker,
Attorneys.

INVENTOR.
Edgar Gretener,
BY
Pierce, Scheffler & Parker,
Attorneys.

INVENTOR.
Edgar Gretener,
BY Pierce, Scheffler + Parker,
ATTORNEYS.

July 8, 1958 E. GRETENER 2,842,609

METHOD FOR THE TRANSMISSION AND REPRODUCTION OF COLOR TELEVISION IMAGES

Filed April 23, 1953 5 Sheets-Sheet 4

INVENTOR.
Edgar Gretener,
BY
Pierce, Scheffler & Parker,
Attorneys.

July 8, 1958

E. GRETENER 2,842,609

METHOD FOR THE TRANSMISSION AND REPRODUCTION OF COLOR TELEVISION IMAGES

Filed April 23, 1953

5 Sheets-Sheet 5

INVENTOR.

Edgar Gretener,

BY

Pierce, Scheffler + Parker,

Attorneys.

United States Patent Office 2,842,609

Patented July 8, 1958

2,842,609

METHOD FOR THE TRANSMISSION AND REPRODUCTION OF COLOR TELEVISION IMAGES

Edgar Gretener, Zurich, Switzerland, assignor to Dr. Edgar Gretener A. G., Zurich, Switzerland, a firm Application April 23, 1953, Serial No. 350,668

Claims priority, application Switzerland April 23, 1952

10 Claims. (Cl. 178—5.2)

The present invention relates to a method for the transmission and reproduction of television images in color.

Processes employed today for the transmission and reproduction of television images in color generally apply the principle of additional color mixture. At the transmitter side the color components of every image point are formed with respect to (generally three) suitably chosen fundamental colors and transmitted by corresponding component color signals. At the receiver these color component signals are transformed into the corresponding color component images and superimposed in register. It is known from color photography that such a trichromatic process permits faithful image reproduction if certain color deviations are disregarded which stem from the fact that certain theoretical requirements regarding the pickup and reproduction filters cannot be met with in practice. The principal requirement is that the ratio of color components, which is relevant for the color of each particular image point, must not be distorted during pickup, transmission and reception, and that the superimposition of color component images is effected in register with an extremely high accuracy.

Color degradation will result from any distortion of the color component ratio, whereas lack of register will cause color fringes. Color degradation is particularly disturbing with the desaturated colors which only slightly deviate from white. With such colors even a slight distortion of the color component ratio may cause a change-over of the color hue, by ways of example from the whitish-blue hue to a whitish-red one. Color fringes are particularly disturbing at such points where an accentuated variation of the color hue or of brightness occurs.

It is the object of the present invention to achieve transmission and reproduction of television images free of color degradation and errors of register.

Furthermore it is an object of the invention to reduce the influence of non-linear characteristics of the employed apparatus upon the fidelity of color reproduction.

Another object of the invention is to reduce the bandwidth without impairing the sharpness of the transmitted images.

More specifically the present invention is directed to a method for transmission and reproduction of colored television images. According to the invention it is characterized by the feature that the color component images formed relatively to three reproduction colors in the pickup apparatus are continuously transformed into four signals which approximately correspond to the white component and to the three color residues and that from these four signals four partial images are formed in the receiver apparatus which are superimposed in register.

Further objects and features of the present invention will become obvious from the following specification, wherein embodiments of the invention will be explained with reference to the attached drawings, where, Figs. 1A and 1B explain the separation of three color components into white content and three color residues according to the present invention.

Fig. 2 explains the synthesis of a particular color by the four signals with the aid of a color coordinate system.

Figure 9:
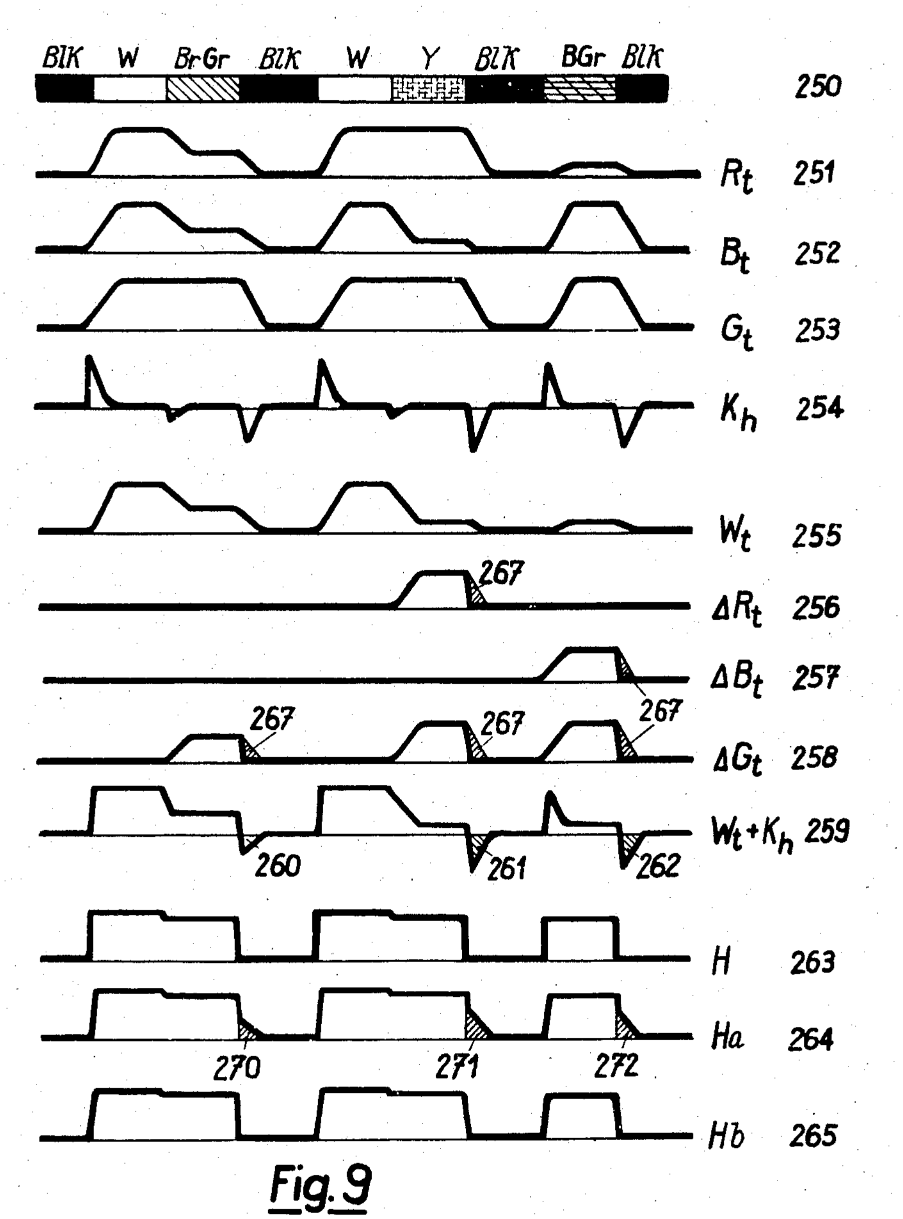
Figure 10:
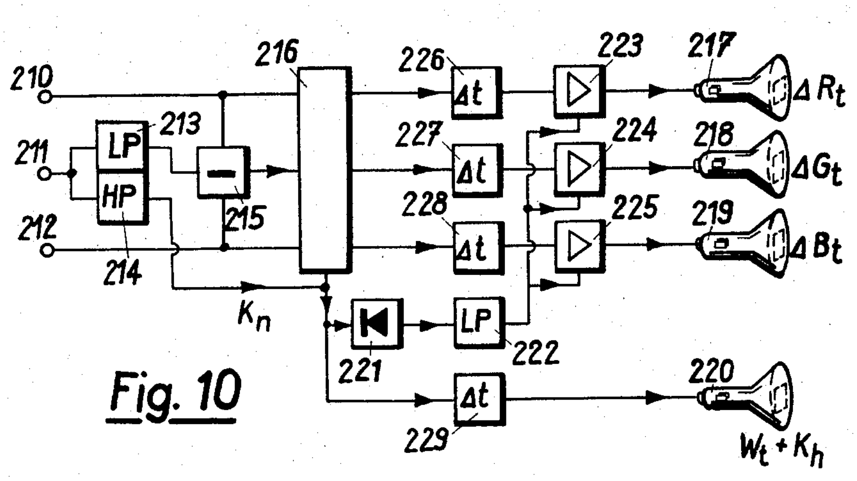

Fig. 9 schematically represents the variation in time of the signals transmitted and transformed in the receiver, as well as the resultant variation of brightness, and Fig. 10 represents a block diagram of an arrangement for executing the method according to the invention.

Figure 11:
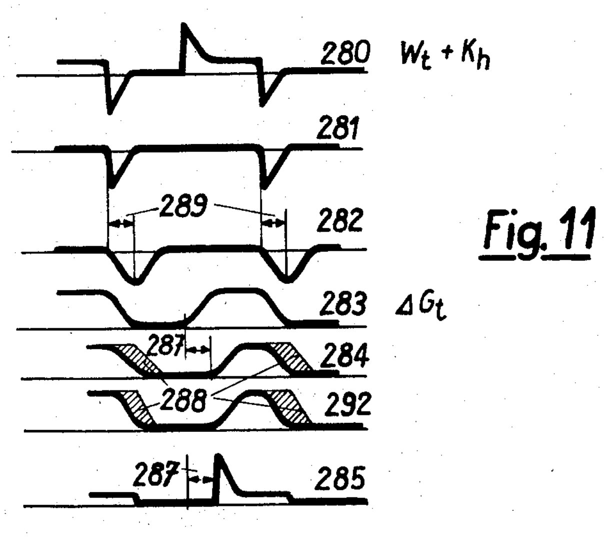
Figure 11A:
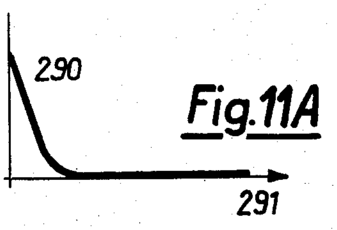

Figs. 11 and 11A furthermore serve to explain operation of the method.

Figure 1A:
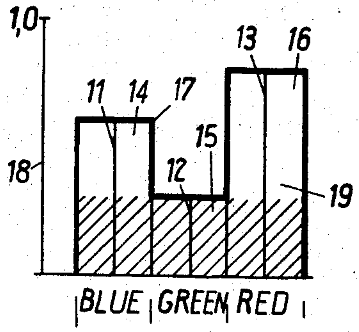

The physical meaning of the terms "white content" and "color residues" may most easily be explained with the aid of the diagram shown in Fig. 1A. As has already been mentioned, the color of an image point in color television processes is positively defined by the ratio of the three color component signals corresponding to the three components of this particular color. At the receiver the image point is reconstituted in its original color by the superimposition of three reproducton colored lights with an intensity proportional to the appertaining color component signal.

As shown in Fig. 1A, by ways of example the three color component signals 11, 12 and 13, which are related to the three fundamental colors Blue, Green and Red, may be obtained when picking up a particular color. Three colored lights are employed for reproduction, the spectral characteristics 14, 15 and 16 of which each cover only the spectral range of the appertaining pickup color as has been indicated schematically. In reality such spectral characteristics of colored lights may only approximately be obtained. The intensity of the three lights, 14, 15 and 16 is proportional to the three signals 11, 12 and 13 and superimposition produces a spectral distribution of light 17, shown in full lines, which corresponds to the color to be transmitted. The scale 19 of coordinates of the three signals has been arbitrarily chosen in such a manner that the three signals are of equal size for White. In the example shown the three color component images 11 (B), 12 (G) and 13 (R) have the relative values .6, .3 and .8. As is well known, white light shows an intensity uniformly distributed over the entire range of visible light. The curve 17 composed of components 14, 15 and 16 thus contains a certain portion of white light indicated by hatching and the intensity of this white content is equal to the intensity of the smallest component 15. This fact is utilized by the method according to the present invention. The three component signals are transformed into four signals, the "white content signals" and the "color residue signals."

Figure 1B:
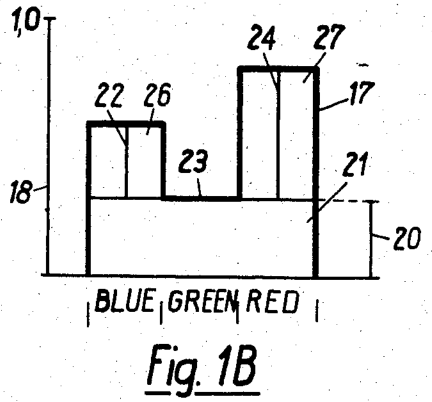

Fig. 1B explains the separating process. The "color content signal" 20 corresponds to the value of the white light content 21 of the spectral diagram, the "color residue signals" 22, 23 and 24 correspond to the remaining light contained in the appertaining color component range after deduction of white content 21. In the present example subtraction of the white content 21 leaves a residue portion 26 within the range of the blue component color. The "white content signal" assumes a value .3, since this is the above stated value of the minimum or green color component, the blue color residue signal a value .3 and the red color residue signal a value of .5 while the green color residue signal is zero. Superimposition thereof leads to the same distribution of light 17 as in Fig. 1A.

The color is consequently formed by one white and two colored lights, the white light is referred to as "white content" and is equal at any moment to the value of the smallest of the three color components. The color residues are equal to the value of their original appertaining color component, reduced by the amount of the smallest of the three components. This definition consequently requires that for any color at least one of the three color residues is equal to zero, viz. the color residue of the smallest color component. Reconstitution for reproduction is effected by three lights, a white light having an intensity equal to the white content, and two colored lights corresponding to the reproduction colors of greater magnitudes and having intensities equal to their respective color residue signals.

Figures 2, 3:
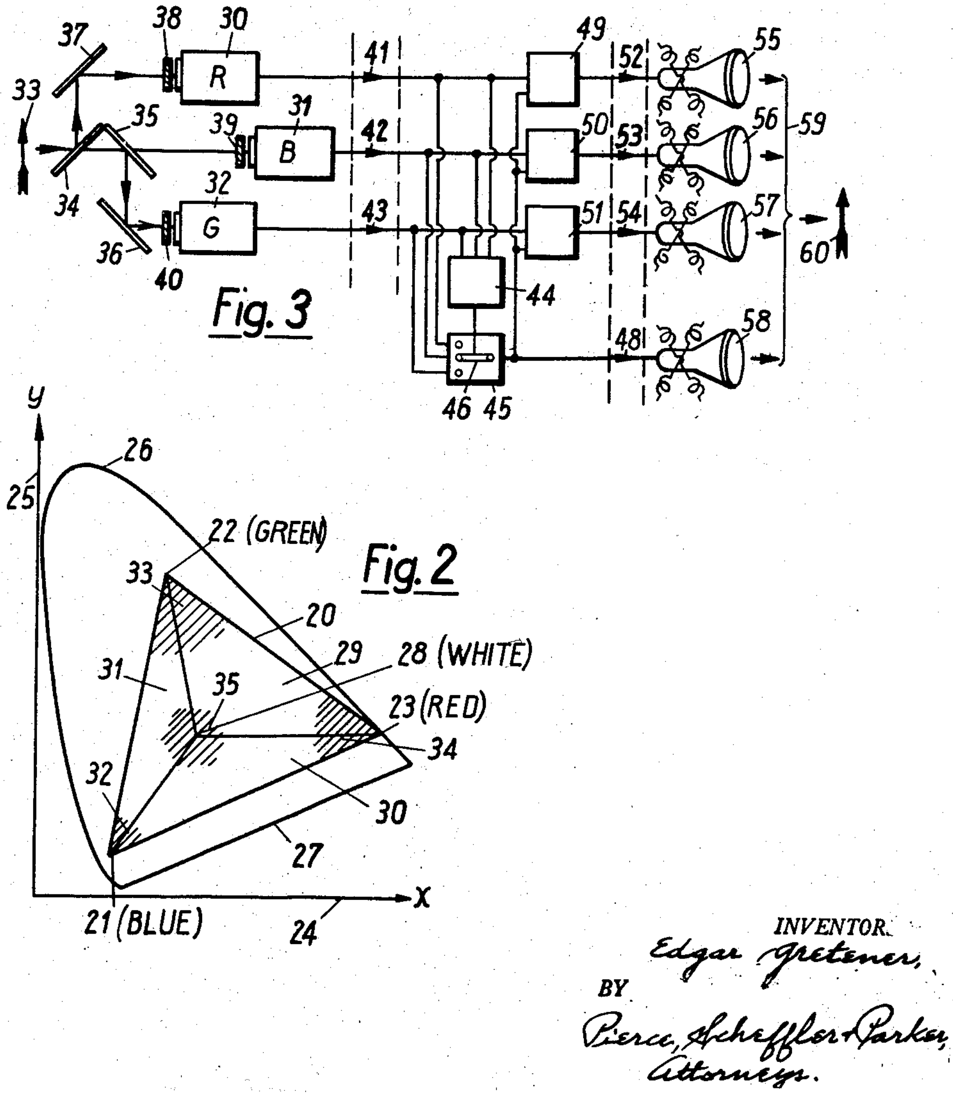
Fig. 3 shows an embodiment in block diagram for executing the method according to the present invention.

Color synthesis by means of the color residues and the white content is represented by Fig. 2. The figure shows a color triangle 20 within a color coordinate system defined by the three fundamental reproduction colors, e. g. Blue, Green and Red with corners (Blue) 21, (Green) 22 and (Red) 23. In the representation the ICI color triangle is employed as color coordinate system determined by the $x$-axis 24 and the $y$-axis 25, wherein as is well known the pure spectral colors are located along a curved path 26 and the purple colors along a straight line 27. It is well known that any color located within the triangle 20 may be reproduced by the superimposition of three colored lights having the colors Blue, Green and Red, the intensity being dependent upon the position of the color to be reproduced within the triangle. Adjustment of colors is generally effected in such a manner that the superimposition of three color components with equal intensity produces White. In contradistinction thereto color reproduction according to the process of the present invention is effected by superimposition of one white and three colored lights, at least one of these three colored lights, however, having the intensity zero. Election of the colored lights is effected in dependence upon the value of the smallest component. The color triangle 20 of Fig. 2 may be divided into three sectors 29, 30 and 31 where within sector 29 the blue color, within sector 30 the green color and within sector 31 the red color component respectively is smaller, than the two other color components. Within sector 29 consequently a color is reproduced by a green and a red, within sector 30 by a red and a blue, and within sector 31 by a blue and a green (and a white) light.

The advantages of this process may easily be understood from Fig. 2. Color distortion, as is well known, is caused by a falsification of the color component ratio and may occur with all colors which are composed of at least two color components. In the special case, that the color to be reproduced is identical to one of the three fundamental colors the disturbing factors which ordinarily act upon the ratio of color components may only cause a distorted reproduction of brightness. The amount of color deviation which is caused by a definite percentage of deviation of the color component ratio from its original value is not identical all over the entire color triangle, but will be the smaller, the nearer the particular color is located with respect to the fundamental colors, Blue, Green and Red. At the vicinity of each fundamental color there is an area within which this deviation remains below the threshold of sensitivity to color variation of the eye. In Fig. 2 these areas 32, 33 and 34 have been indicated by hatching. The employment of white as fourth reproduction color has as a consequence that a fourth area 35 is located around the white point within which variations are not perceived by the eye. This area covers those colors which are particularly liable to color degradation, viz. the whitish color hues. By the employment of White as fourth reproduction color a distortion of the ratio of the white content and the two color residues may not produce the above mentioned changeover of the whitish color hues. It is, however, necessary that the pickup process permits correct formation of the three color components and that the white content is separated without error.

As the separation of the white content signal from the color component signals must be effected in a point by point manner, it is necessary that the color component signals appertaining to a particular image point are formed simultaneously or that they are at least available simultaneously within the apparatus employed for separating the white content. This separation of the white content may consequently only be effected with such color transmission systems where the signals appertaining to an image point are formed simultaneously. Under certain circumstances also a point-sequential system may be employed where the signals appertaining to an image point—or at least to a very small image element—are produced in immediate succession. In this case delay circuits (delay networks etc.) must be employed which produce a different amount of lag of the different signals so that they may be compared in the apparatus for separating the white content.

Fig. 3 shows in a block diagram an embodiment for executing the process according to the present invention. Three cameras 30, 31 and 32 are employed at the pickup side, which form the color component signals of the image 33 to be reproduced. Separation of the impinging light to the three cameras is effected by a color splitter array which by way of example may consist of two half-silvered mirrors 34 and 35, two ordinary mirrors 36 and 37 and three color filters 38, 39 and 40 located in front of the cameras. The color filters are chosen in such a manner that camera 30 forms the red, camera 31 the blue and camera 32 the green color component signals. In place of the half-silvered mirrors 34 and 35 interference filters may also be employed which permit spectral separation of the light. In this case additional color filters may be dispensed with. In case of employment of interference filters by way of example mirror 34 is so adjusted that it reflects red light, transmits green and blue light, and mirror 35 in such a manner that it reflects green light but transmits blue light.

The color component signals formed by the three cameras are thus connected to the apparatus for separating the white content through three separate channels 41, 42 and 43. As is schematically shown in Fig. 3, this apparatus comprises a selector circuit 44, a multiple switch 45 and three subtraction devices 49, 50 and 51. The three contacts of the multiple switch 45 are connected to channels 41, 42 and 43 whereas the contact brush 46 is connected to the white component channel 48. The selector circuit 44 possesses three inputs which are connected to the three channels 41, 42 and 43 and actuates the multiple switch 45 in such a manner that the brush 46 is connected to that one of channels 41, 42 or 43, the color component of which is smallest at the respective moment. The three subtraction circuits 49, 50 and 51 each form the difference of the signals connected to their two inputs, one of the inputs being connected to the appertaining color channel 41, 42 or 43 respectively, and the second input to the white content channel 48. The arrangement operates as follows: by way of example the red component be the smallest at the moment shown in the drawing. The contact brush 46 of the multiple switch 45 is actuated in such a manner by the selector circuit 44, that the white content channel 48 is connected through to the red channel 41. The red signal is thereby at the same time connected to the inputs of the three subtraction circuits 49, 50 and 51 which now form the difference between the red signal and the appertaining color component signals. Thus device 51 forms the difference "green minus red," the device 50 "blue minus red" and the device 49 "red minus red," e. g. zero. The subtraction circuits 49, 50 and 51 feed three reproduction devices 55, 56 and 57 over three color residue channels 52, 53 and 54, and the white content channel 48 a fourth reproduction device 58, the reproduction devices being schematically represented in the drawing as cathode-ray tubes. The partial images produced by the four cathode-ray tubes 55, 56, 57 and 58 are superimposed in register as indicated by bracket 59 and thus form the tricolored image 60. Transmission strictly speaking is effected either between the pickup apparatus and the device for separation of the white content, i. e. over the three color channels 41, 42 and 43 or between the device for separating the white content and the reproduction devices, i. e. over the four channels 42, 43, 44 and 48. Thus separation of White is in the first case effected at the receiver, in the latter case it is effected at the transmitter. Separation at the transmitter has the advantage that all influences disturbing the ratio of component during transmission are eliminated. Separation of White at the receiver on the other hand avoids additional frequency space required for the white content channel.

Figures 4A, 4B, 5:
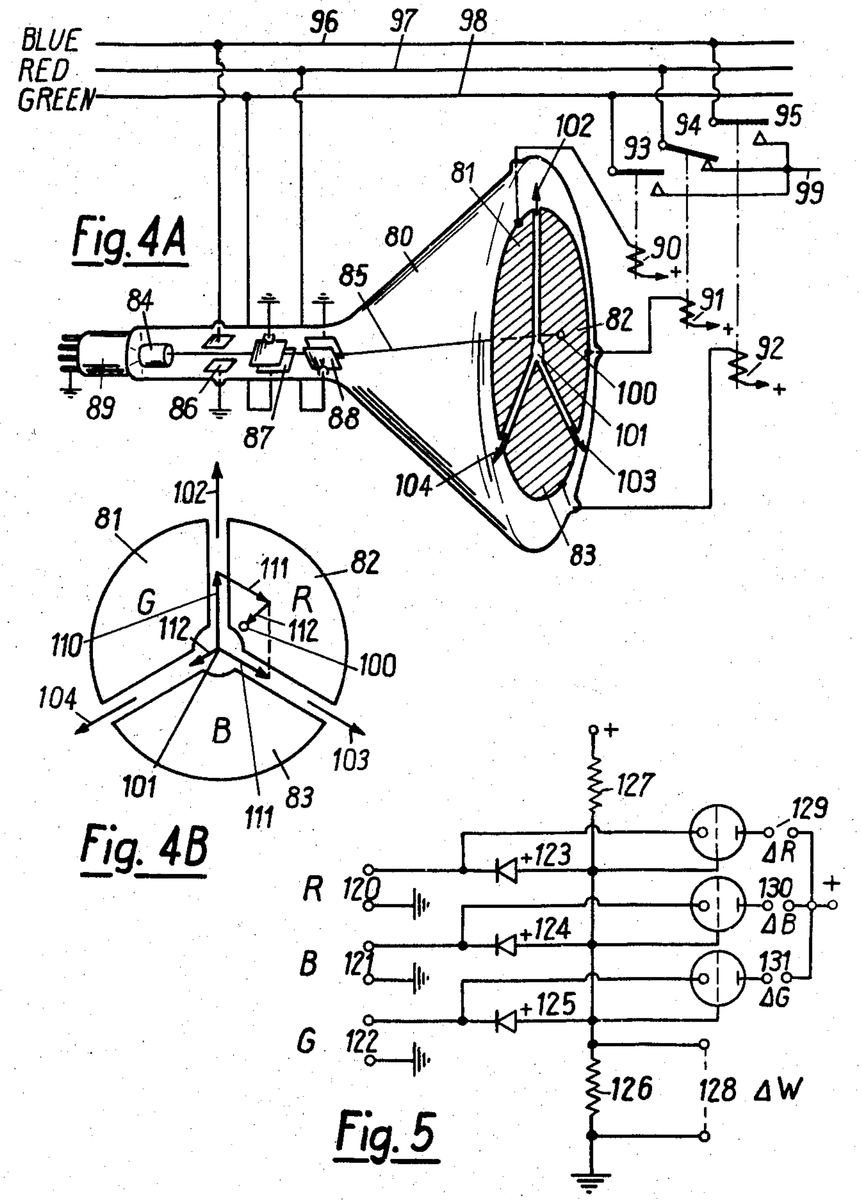
Figs. 4A and 4B show in schematic perspective representation a cathode-ray switch for performing the separation of white content, and Fig. 5 a rectifier circuit for the same purpose.

An embodiment of the device for selecting the smallest color component signal employing a cathode-ray switch is schematically represented in Fig. 4A. The cathode-ray switch is composed of a glass bulb 80 having three separate electrode plates 81, 82 and 83 applied to its interior screen plate surfaces. The electron gun 84 produces an electron beam 85 and the three pairs of deflection plates 86, 87 and 88 serve to deflect the electron beam in three different directions. A socket 89 serves to support the tube and connects it to other circuit elements. The three pairs of deflection plates 86, 87 and 88 are so inclined to each other that each deflects the electron beam in one of three directions inclined to each other by 120°. These directions are each parallel respectively to the boundaries of the three switching sectors 81, 82 and 83. These sectors are separately connected to three relays 90, 91 and 92. In place of the relays other electronic devices may be employed. In operated position the "make"-contacts 94, 95 and 96 of the three relays connect the appertaining colour channel 96, 97 or 98 to the white content channel 99.

The device operates in the following manner: the three pairs of plates 86, 87 and 88 are separately connected to the three color channels 96, 97 and 98. If no tension is applied to any of the pairs of plates, the spot 100 of the electron beam 85 will be located at point 101 at the center of the screen. The electron beam thus does not contact any of the three sectors. The sense of deflection caused by the three pairs of plates 86, 87 and 88 is now chosen in such a manner, that the spot 100 is deflected in direction of arrow 102 by the pair of plates 86 by an increase of e. g. the blue color component signal connected thereto. The pair of plates 87 connected to the green signal displaces the spot in direction of arrow 103 and the pair of plates 88 connected to the red color channel in direction of arrow 104. Depending upon the different size of the three color component signals the spot will impinge upon one of the three sectors 81, 82 or 83 and will cause the connected relay to attract.

The position of the spot 100 is obtained by addition of the three deflection vectors 110, 111, 112 which are proportional to the size of appertaining color component signals. Thus spot 100 will be located at any moment at the sector which is located opposite to the direction of deflection of the smallest color component. Thus spot 100 will be located within sector 81, 82 or 83, if the green, red or blue color component signal is the smallest of the three, respectively. Thereby the relay related to this component is actuated and the white content terminal 99 is connected to the corresponding color channel. In the case shown by Fig. 4B, the red signal 112 is smaller than the blue signal 110 and the green signal 111. Consequently relay 94 related to red will be operated and the smallest, i. e. the red color component signal will be selected as white content and appear at terminal 99.

It is obvious that a rectifier circuit as shown by Fig. 5 may also be employed in place of a cathode-ray switch. The three color signals red, blue and green are connected to three inputs 120, 121 and 122 one pole being grounded. The three inputs are connected through three rectifier cells 123, 124 and 125 to a common resistor 126, one terminal of which is likewise grounded. The terminals of the three rectifiers connected to resistor 126 are connected through a resistor 127 to a positive bias potential, the direction of flow of the rectifiers being so chosen that they are rendered transmitting by the positive bias. It will be easily understood that the voltage drop across resistor 126 will always be equal to the value of the smallest of the three color component signals connected to terminals 120, 121 and 122. The large color component signals act in a sense opposite to the positive bias and block the appertaining rectifier. For this purpose it is necessary that resistor 126 which provides the bias for the three rectifiers is relatively large with respect to the internal resistance of the rectifier and of the current sources feeding terminals 120, 121 and 122. The voltage drop across resistor 126 corresponding to the value of the smallest color component signal may be obtained as white content W between terminals 128 and ground. The voltage drops now existing across the three rectifiers are equal to the color residues R, B, G. The voltage drops may either be directly utilized, or they may be utilized to control the anode current of three triodes 132, 133 and 134. In the latter case three color residue signals are obtained at terminals 129, 130 and 131 which have a definite ground potential, in contradistinction to the voltage drop across rectifiers 123, 124 and 125. The circuit of Fig. 5 thus at the same time effects selection of the smallest component and its subtraction from the other color signals.

Such a transmission method has primarily the advantage that White, i. e. the entire scale of neutral greys is always represented without error. Furthermore, accuracy requirements regarding the register of component images may be reduced. In general the colors of transmitted pictures are of relatively low saturation, i. e. they contain a comparatively large white content. The color residues are comparatively small and thus only serve to add color to the white content image which practically alone produces the image contrast and image sharpness. This fact may be exploited to reduce the frequency band required for transmission and to reduce the accuracy requirements of register. Thus only the white content image is transmitted with broad frequency band, i. e. with high sharpness, whereas the color residues are transmitted with comparatively reduced frequency bands and are superimposed with the reduced sharpness corresponding to reduced frequency band. The reduced sharpness of color residue images avoids the formation of color fringes along the outlines and at other image points with accentuated contrast in color or brightness. Reproduction of the color content of the image with reduced sharpness is also permitted by the fact that the eye is unable to detect color deviations below a certain size of the picture element. Due to this fact the whitening of contours caused by transmission of the color residue images with reduced sharpness may not give rise to a disturbing impression. If the separation of White is effected at the receiver, economy in band width may be effected by transmitting only part of the color signals with a broad frequency band, viz. only those signals from which the sharpness of the white content image is derived.

Figure 6:
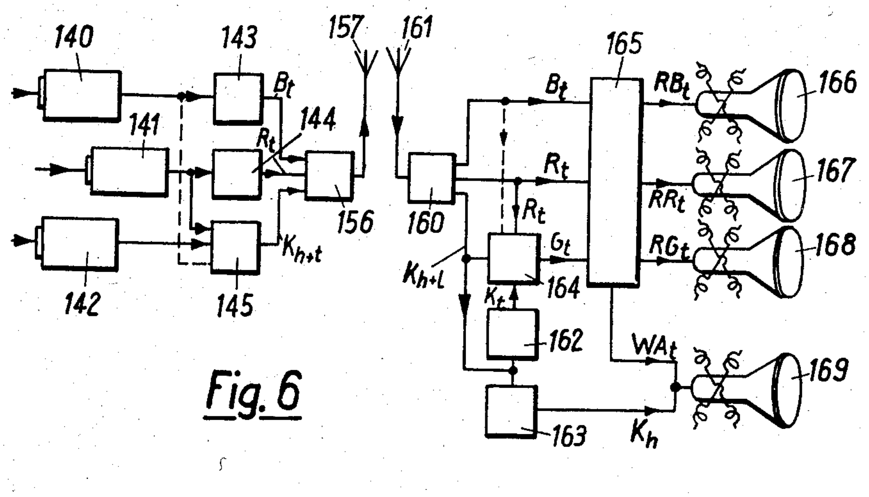
Fig. 6 shows in block diagram a modification of the arrangement shown in Fig. 3 for executing the method according to the present invention.

An arrangement which employs the principle of separation of White at the receiver but which exploits the possibiltiy of transmitting only such signals with a broad frequency band from which the sharpness of the white content image is derived, is schematically shown in Fig. 6. At the transmitter, three color cameras 140, 141 and 142 serve to form the three color component signals Blue, Red and Green. All three cameras produce color signals of equal frequency breadth corresponding to their power of resolution. Two low passes 143, and 144 are connected to the output of the blue and red camera, transmitting only the low frequency portions of the blue and red color component signals. For the sake of clarity the low frequency portions will be referred to in the drawings and in the following description as "Blue low" ($B_t$) and "Red low" ($R_t$). The green and red (and in some cases also the blue) camera simultaneously feed a mixer 145 which combines the green and red (in some cases also the blue) color component signals to form a combined signal. This combined signal does not undergo a frequency band restriction and thus contains the low-frequency and high-frequency portions of the color component signals employed for its formation. By a suitable choice of the ratio of the three color component signals, employed for formation, the combined signals will at the same time represent the so-called "brightness" of the color to be reproduced.

It may also be imagined to produce the combined signals directly from a camera fitted with a suitable pickup filter instead of obtaining it by mixing the three color component signals. This will reduce the requirements for register of the color component signals which must be complied with in case of a mixer, where it is obvious that the three color components formed at any moment in the three pickup devices must correspond to the same image point. For the purpose of reducing these difficulties of register, it may also be imagined to feed to the mixer only the low frequency portions of the red and blue color component signal. This corresponds to a reduction of the resolution of these component signals and thus reduces the requirements of accuracy of register. In the following the combined signals will be referred to as combination signals high plus low ($K_{h+t}$). The three signals $B_t$, $R_t$ and $K_{h+t}$ are now employed to modulate a common transmitter, by ways of example on adjoining side bands, and are radiated by antenna 157.

At the receiver the receiving apparatus 160 separates the intelligence received by antenna 161 into the three signals $B_t$, $R_t$ and $K_{h+t}$ by suitable separation means. The combined signal is now split into its low and high frequency portion by a low pass 162 and a high pass 163. The low frequency portion $K_t$ is connected to a mixer 164, which is at the same time connected to the red channel (and in some cases also to the blue channel) and which subtracts the red signal (and the blue signal) from the combined signal. Thus the low frequency portion of the green component is obtained. The three low frequency color components $B_t$, $G_t$ and $R_t$ are connected to device 165 which serves for separation of the white content and which may have the form of the devices explained by Figs. 3, 4 or 5. This device forms the (low-frequency) color residues $RB_t$, $RR_t$, $RG_t$ and the (low-frequency) white content $WA_t$. The three color residues $RB_t$, $RR_t$, $RG_t$ are connected to three kinescopes 166, 167 and 168 which reconstitute the color residue images with the sharpness which corresponds to the limited frequency band of the three color residue signals or to the color component signals employed for forming them, respectively. The fourth kinescope is simultaneously controlled by the separated white content signal $WA_t$ and the high frequency portion $K_h$ of the received combined signal. This simultaneous signal, it is true, and the picture details consequently reproduced by kinescope 169, are not exactly identical to the white content which would be formed at the output terminals of the cameras 40, 41 and 42 as its high frequency portion contains the sum from two (or three) color components. This deviation, however, is negligible in view of the above mentioned reduced sensibility of the eye to the color of small picture elements.

The process according to the present invention basically permits faithful transmission free of color deviation particularly of the scale of greys. Furthermore it permits to avoid certain errors which occur during transmission and reproduction. These color deviations ensue from relative variation and form non-linearity of the characteristics of the devices employed for transmission and reproduction. In order to obtain faithful reproduction by transmission of three color components, the members of the transmission chain must provide a linear characteristic. This, however, is generally not the case and particularly the reproduction devices show amplitude characteristics, which are linear only within a limited center portion. A "toe" part and a "shoulder" part generally adjoin the lower and upper end of the linear center part. Transmission of television signals over such characteristics may falsify the ratio of color components, the effect caused by the toe part being different from the one caused by the shoulder part.

Figure 7:
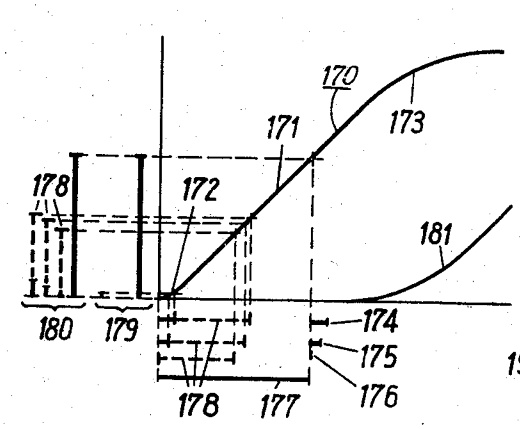
Fig. 7 shows the amplitude characteristic of the reproduction apparatus and of an intermediate member used for linearisation of the embodiment of Fig. 8.

If the employed reproduction devices have the characteristics as shown by Fig. 7, different conditions prevail for the transmission of saturated and desaturated colors. The white content of saturated colors is small, whereas it is comparatively large for desaturated colors. With saturated colors the white content will be transmitted over the toe part of the characteristic, it is thereby falsified and the saturation of the colors increased. This error is of minor importance as highly saturated colors occur comparatively seldom. With desaturated colors, however, the white content is comparatively large and is located at the linear portion of the characteristic. The color residues, however, which are comparatively small with desaturated colors, will mostly be located in the toe part which again causes falsification of ratio and disturbing color deviations. To avoid this latter effect, preferably the separation of the white content is effected in such a manner, that the four signals only approximately correspond to the white content and to the three color residues. The color residues are made slightly larger than would correspond to their exact value so that they are shifted from the toe part to the linear part of the characteristic.

This will be explained with the aid of Fig. 7 which shows a characteristic curve composed by the linear center part 171, the toe part 172 and the shoulder part 173. If now the three color residue signals 174, 175 and 176 and the white content signal 177 are transmitted, the two color residues 174 and 175 which are different from zero are transmitted over the toe part and are reproduced with deviating values as signals 179. If, however, constant factors 178 are added to the color residues, the color residue signals will be transmitted over the linear part even with this desaturated color. Subtraction of the constant factor 178 re-established the original size of the color residue signals 180.

This method may be executed in different manner. Either a constant voltage or a small fraction of the white content signal is added to the color residue signals after separation of the white content. This additional voltage must be subtracted from the color residue signals before reproduction in order that superimposition of the four signals is effected in a correct manner and reproduces the original color. To effect a compensation of the toe part of the characteristic of the transmission devices, addition of a fraction of the white content signal is preferable as the same fraction may be deducted from the white content signal after transmission thus eliminating disturbing effects of fluctuations of the transmission factor. If it is intended not only to compensate deviations of the characteristic of transmission devices, but also of reproduction devices, a small fraction of the white content signal equal for all three color residue signals may be added to the color residue signals before transmission and the white content signals may at the same time be reduced by the same amount. The four signals thus obtained are directly employed for the formation of the component images so that the actual white content of the reproduction image is obtained as the sum of the reduced white content and the sum of the fraction of the white content added to the color residue signals. Similar measures may be employed in case of overload on the characteristic, i. e. when one or more of the four signals reach into the shoulder part. This is particularly disturbing when transmitting bright and desaturated colors. In this case, the white content is reduced, i. e. its amplitude is compressed, whereas the color residue signals are still within the linear part. Thereby a disturbing increase of color saturation is effected. Remedy is found by following a similar path as indicated above. A small fraction of the white content signal is added in identical size to all three color residue signals. The value of this fraction is made dependent upon the value of the white content in such a manner that the added fraction increases as the white content signal increases, i. e. as the distortion caused by the separation of the characteristic increases.

This may also be explained with the aid of Fig. 7. If by way of example the amplitude of the color residue signals 174 and 175 and of the white content signal 177 is increased without altering at the same time the ratio of these signals, i. e. if the same color is reproduced with increased brightness, the white content signal will first reach the shoulder part 172 of the characteristic and will be distorted. An equal fraction of the white content signal is therefore added to the three color residue signals, which increases with increasing size of the white content signal. This fraction is now given such a value that it just compensates the compression of the white content signal. Addition of the fraction of the white content signal to the color residue signals is effected by means of supplementary devices, having the characteristic 181 as shown by Fig. 7, i. e. the added fraction of the white content is equal to zero as long as the white content is within the linear part 171, but it increases as the white content approaches the area of saturation 173. As the fraction is added to all three color residue channels with equal size, superimposition of these fractions added to the three color residues will again produce "White" on the projection screen. This white is added on the projection screen to the light produced by the white content kinescope. The white light available at the projection screen is thus equal to the sum of characteristics 170 and 181, i. e. reproduction of the white content is linearized also in the area of saturation and this linearisation will be effective as long as at least one of the color residue signals likewise reaches the area of saturation.

If such a characteristic only occurs with the reproduction devices, separation of white content with the purpose to eliminate the disturbing effects thereof may be executed at the transmitter as well as at the receiver. Separation of White at the transmitter provides the additional advantage of eliminating at the same time the influence of relative fluctuations of the transmission factor of the different channels which would cause a decoloration of the whites (grey scale). In this case, however, four channels are necessary in place of the customary three channels. However only the white content channel must have a broad frequency band corresponding to the desired resolution of image details, whereas the frequency band of the color residue channels need only be so broad as to reproduce correctly the color over large areas.

Instead of adding fractions of the white content of equal size to the three color residue channels, for the purpose of compensating the influence of the toe portion, as has been mentioned above, the white content subtracted from the color component signals at the occasion of the separation of White may also initially be reduced by this fraction and the color residue signals thus be made larger by the same fraction. The addition of the white content for the purpose of compensating the saturation effect requires employment of an intermediate member, the non-linear characteristic of which must be complementary to the characteristic of reproduction devices as has been shown by Fig. 7. This may likewise be effected by the employment of biased rectifiers.

Figure 8:
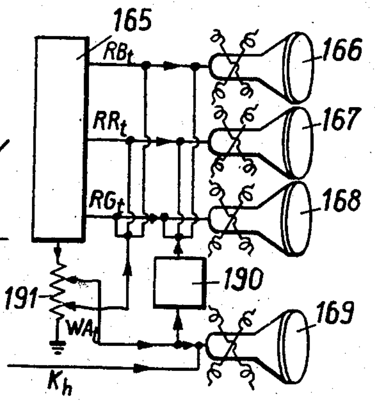
Fig. 8 shows a modification of the embodiment of Fig. 6 for compensating the toe and shoulder parts of the characteristic of the transmission and reproduction apparatus.

Fig. 8 shows a modification of the reception circuits of Fig. 6 where an intermediate member 190 is employed having the non-linear characteristic shown by Fig. 7. The other parts of the circuit are identical to those of Fig. 6 and are referred to by the same numerals. The intermediate member 190 is fed by the lower frequency portion of the white content signal $WA_t$ and in dependence of its value adds an equal amount to the three color residue signals $RB_t$, $RR_t$ and $RG_t$. If this device is used at the same time for compensating the disturbing effects of the toe and shoulder parts of the characteristic of the reproduction devices a voltage divider 191 as schematically shown may be employed which produces at the same time the reduced portion of white content signal to feed kinescope 169 and the complementary part of the white content signal to be added to the three color residue signals. If the reduced white content signal attains the saturation part, the amount produced by the non-linear member 190 will be added to the constant fraction.

With a television transmission system as shown by Figs. 6 and 8, the high-frequency and low-frequency components of certain signals—by way of example of the white content signals or of the combined signal—are reproduced by separate devices such as kinescopes, etc. Due to this separation into high- or low-frequency components, it may occasionally occur that particularly the first one may assume a negative sign, e. g. along borders with great brightness contrast. If both components are reproduced in one single device, the difference will be reproduced as a positive light value. In case of separate reproduction, however, one of the devices must reproduce a negative light value, which is physically impossible.

Fig. 9 serves to explain the method by which this difficulty can be overcome. A line 250 by way of example may contain in succession the colors Black, White, Bright Green, Black, White, Yellow, Black, Bluegreen and Black, which adjoin with sharp boundaries. Below line 250 the corresponding variation of the red 251, blue 252 color component signals ($R_t$) and ($B_t$) has been shown as well as the variations of the green 253 component ($G_t$) produced within the receiver and the high-frequency portion 254 of the combined signal ($K_h$).

The white parts of line 250 are represented by color component signals of identical size. In this case of bright green the blue and red components only amount to half of the green component. For the reproduction of yellow the red and green components are identical, whereas the blue component only amounts to the fourth part thereof, and for the reproduction of Bluegreen, the red component is only a fourth part of the blue or green component, respectively.

Due to the limitation of the three color component signals to the low-frequency domain, the three color signals do not show the square form which would result from the sharp borders between the colors along line 250, but show the flattened form caused by suppression of the higher harmonics. The combined signal, which only contains the high-frequency portion, and thus only the higher harmonics, shows a reverse behaviour. The transitions between the fields of line 250 are indicated by steep surges whereas the signal falls off to zero in approximately the same measure in which the low-frequency components attain their final values.

Separation of the white content from the three color signals 251, 252 and 253 produces the variation of the low-frequency white content signal 255 as well as the color residue signals 256, 257 and 258. In case of the reproduction of white, the white content signal is equal to the value of the color signals, whereas the color residue signals are equal to zero. In the case of reproduction of colors the white content signal will always be equal to the smallest color signal, whereas the color residue signals are equal to the difference between related color signals and the white content signal. The signal voltage 259 is obtained by addition of the low-frequency white content ($W_t$) and of the high-frequency combined signal ($K_h$), which serve for controlling the white content tube.

It has been assumed for representation that the combined signal is formed at the transmitter by addition of the three color components according to the formula $$K=.7G+.2R+.1B$$

In this case the combined signal approximately represents the brightness of the respective color. At the border between black and white the amplitude of a combined signal is equal to 1.0, at the border between Black and Bluegreen it is .85 etc. As may be seen, the control voltage for the white content tube, i. e. the white content signal containing the high-frequency component, will assume negative values at the border lines from bright to black parts, i. e. 260, 261 and 262. At these points the numeric value of the (negative) combined signal exceeds the (positive) value of the low-frequency white content signal.

It must be taken into consideration that the negative values are due to the separation into a low-frequency and a high-frequency portion of the combined signal corresponding to brightness. Both portions in any case sum up to a positive value as a negative brightness is without physical meaning. In the arrangement described above, however, both portions are separated and the high-frequency portion is added to the white content. According to definition this is equal to the smallest of the three color components and thus will always be smaller or only in some instances equal to brightness. Reproduction of at least one of the color residues is now suppressed at those points where the white content signal combining the high-frequency component assumes a negative sign. As has been represented in the drawing, the hatched areas 267 of voltages 256, 257 and 258 are thus suppressed.

In order to further explain this method, the desired curve 263 of brightness H as well as the curve 264 or H*a* of brightness without and the curve 265 or H*f* of brightness with application of the method according to the present invention has been shown in Fig. 9. The numerical value of brightness H has been computed according to the above indicated formula. As represented by curve 264, brightness shows a slow decay instead of a sharp jump, if the method according to the invention is not employed at such points which correspond to the negative portions of the combined white content signals 260, 261 and 262. At these points representation of brightness is distorted. The screen of the white content tube is dark so that these points will appear colored due to the slow decay of the color residue signals. Area 270 will thus be red, area 271 yellow and area 272 bluegreen. Zones of progressive transition appear in place of the original with sharp edges, which are furthermore colored and thus will represent a particularly disturbing phenomenon. If the color residue signals are suppressed at these points as prescribed above, the correct distribution of brightness along the lines will be reproduced with high approximation as indicated by curve 265.

Fig. 10 shows in a block diagram an embodiment for executing this method. At the receiver the three signals $R_t$, $B_t$, and $K_{h+t}$ are fed to the three terminals 210, 211 and 212. The high-frequency ($K_h$) and the low frequency ($K_t$) portion of the combined signal fed to terminal 211 are separated by a low-pass 213 and a high-pass 214. In a subtraction device 215, the green signal is reconstituted subtracting the red and blue signals from the low-frequency portion of the combined signal, thus forming the low-frequency portion ($G_t$) of the green component. The three low-frequency signals $R_t$, $B_t$, $G_t$ are connected to a device 216, represented as a simple block, serving to separate the white content. At the output terminals of device 216 the three color residue signals $\Delta R_t$, $\Delta B_t$, and $\Delta G_t$ and the low-frequency white content $W_t$ are obtained. To the latter the high-frequency portion of the combined signal $K_h$ is added. The four signals thus obtained $\Delta R_t$, $\Delta B_t$, $\Delta G_t$ $(W_t+K_h)$ are delivered to three color residue tubes 217, 218 and 219 and to a white content tube 220. Superimposition of the images produced by these tubes are effected by well known optical means not shown in the drawing.

A control voltage is derived from the white content signal in a rectifier device 221 in such a manner that a control voltage is obtained at the output terminals of device 221 only in case of a negative sign of the high-frequency combined signal, whereas it will always be equal to zero as long as the combined signal has a positive sign. As "positive" will be considered such voltages which reach from black pedestal into the operating range of the kinescope and which are thus capable of effecting a modulation of brightness. A low pass 222 is connected to the output terminals of the rectifier device the purpose of which will be described below. The separated low-frequency portion of the control voltage is utilized for suppressing the reproduction of the color residue. By ways of example the control voltage is delivered to three variable gain amplifiers. The characteristic of these amplifiers is determined in such a manner that the gain decreases with increasing control voltage. Suppression of the color residue may be effected in a different manner, by ways of example by simply subtracting the control voltage from the color residue signals, or by feeding it to any point of the reproduction device where a keying operation i. e. a suppression of the reproduction of the color residue is possible.

In a rectifier device 221 the control voltage is produced in dependence upon the combination signal. The rectifier is of the one-way type and the direction of flow is chosen in such a manner that a control voltage is only produced if the combined signal assumes a negative sign. The low pass 222 serves for suppression of the higher harmonics and furthermore has the effect of extending the effective duration of the control voltage, i. e. of the control impulses, so that suppression of the color residue signals is guaranteed even if the different signals are delayed by different amounts during pickup and transmission, i. e. if registration errors occur. The control impulse is thereby flattened out at the same time so that suppression of color residue signals is effected progressively and that double edges due to registration errors in the receiver are avoided. This kind of generating the control impulses, however, entails at the same time a certain delay.

For this reason delay lines 226, 227 and 228 are inserted into the circuits of the color residue signals in advance of their respective variable gain amplifiers 223, 224 and 225 to delay the three signals by equal amounts. These delay lines serve to compensate a delay of the control voltage occurring in the rectifier and low pass and even to give it a certain advance over the color residue signals. A delay of the color residue signals must approximately correspond to the time which the control voltage requires to rise to its final value. It is thereby guaranteed that suppression of the color residue signals is effected at that point of the image, where the white content combining the high-frequency component assumes a negative sign. If this compensation was not introduced the color residue signals would not be influenced correctly by the control voltage. The signals to be controlled by the control voltage would by way of example have already passed the variable-gain amplifier before the control voltage reaches the necessary size to cause the desired control effect. The same holds good in case of simple subtraction of the control voltage. A fourth delay line 229 serves to introduce a delay of equal amount in the white content channel so that the four signal voltages effective in the four kinescopes at a given moment correspond to the same image point.

Fig. 11 provides further explanation of the function of the arrangement of Fig. 10 and employing the representation of Fig. 9 shows the variation in time of the input voltage 280 and the output voltage 281 of rectifier 221, furthermore the flattened form 282 of this voltage at the output of low pass 222. It is seen that extension of the control impulses at the same time causes a flattened surge. A certain time is required until the control voltage has reached a value sufficient to effect suppression of the color residue signals as required by the present invention. For this purpose the color residue signals are delayed with respect to the control voltage as has been described above.

This is also represnted by Fig. 11. The curves 283 and 284 show the variation of e. g. the green color residue voltage before and after delay line 224 which introduces a delay 287. As has already been mentioned this delay is approximately equal to the time 289 which the control voltage requires to attain its summit value. The control voltage is now by way of example delivered to a variable-gain amplifier the characterisitc of which is shown in Fig. 11A as gain 290 plotted over the control voltage 291. It is seen that the gain of the amplifier has its full value as long as there is no control voltage and that the gain decreases towards zero with increasing control voltage. If a voltage 281 is fed to the amplifier, the rear flange 288 of the color residue voltage 284 is progressively reduced as the control voltage increases, whereby multiple edges which might arise from registration errors of the signals are suppressed. The white content signal is likewise delayed after the control voltage has been derived therefrom so that the white content signal 285 now is in time register with the delayed color residue signals.

As has already been mentioned it is not strictly required to utilize the control voltage for regulating the amplitudes of the color residue signals through the intermediary of a variable-gain amplifier. It is likewise possible to subtract the control voltage directly from the color residue signals if the absolute values are suitably adjusted and thus apply this method. If the flattened control voltage 282 of Fig. 11 is directly subtracted from the color residue signal 284, the resulting voltage 292 is obtained, the rear flanges of which are clipped and which may now serve to control the color residue kinescope.

The method of suppressing the rear flanges of the color residue signals is however not restricted to transmission systems, wherein the white content and the color residues are separated for reproduction. It may advantageously be employed wherever the signals related to the component colors are separated into their low-frequency and high-frequency portions and where these portions are employed for reproduction either separately or in modified combination. This, by way of example, is the case with the so called "mixed highs" method which became known some time ago. With this method the high-frequency portions of e. g. two color components are separated and added to the third component. The third component is transmitted with broad frequency band, the first two components only with narrow frequency band. At the receiver, the high-frequency portions contained in the third component are again added to the other signals transmitted with narrow frequency band with suitable amplitude. In this case it may occur that the high-frequency portions assume a negative sign and that their numerical value is larger than the numerical value of the low-frequency signal to which they are added. In this case the sum of signals will be negative and will be lost during reproduction. It is obvious to anybody skilled in the art that, if suitably adapted, the method according to the present invention may also be employed in such a transmission system.

I claim:

1. In color television apparatus, a transmitter including means for developing three original color significant signals corresponding to the relative magnitudes of the three fundamental reproduction colors of each image element, means at said transmitter for transforming said three original signals into four electrical signals comprising a white content signal of an instantaneous magnitude substantially equal to that of the minimum amplitude original signal and three color residue signals of instantaneous magnitude equal respectively to the amplitudes of said original signal less the instantaneous amplitude of said white content signal, a receiver having four image developing means, circuits for energizing said image-developing means each by a different one of said four electrical signals, means for registering the images displayed on the several image-developing means, means at said transmitter increasing the respective amplitudes of said three color residue signals by equal amounts prior to transmission, and means at said receiver decreasing the respective amplitudes of said three color residue signals by the same amounts.

2. In color television apparatus, the invention as recited in claim 1 wherein the respective amplitudes of said three color residue signals are increased by a predetermined equal percentage of said white content signal prior to transmission and wherein an equal percentage of the received white content signal is subtracted at the receiver side from the three received color residue signals.

3. In a color television apparatus, the invention as recited in claim 1 wherein prior to transmission a small equal percentage of said white content signal is added to said three color residue signals, and wherein said white content signal is reduced by an equal percentage prior to transmission, and wherein the four component images are directly formed from the four received signals at said receiver.

4. In color television apparatus; a transmitter including means for developing three original red, blue and green color signals corresponding to the relative magnitudes of said colors of each image element and means for developing from said three original color signals a combined signal significant simultaneously of said green color signal and of the brightness of the image element, said combined signal containing both high and low frequency components; a receiver, said receiver including means for transforming said three original signals into four electrical signals comprising a white content signal of an instantaneous magnitude substantially equal to that of the minimum amplitude original color signal and three color residue signals of instantaneous magnitude equal respectively to the amplitudes of said original color signals less the instantaneous amplitude of said white content signal, means for deriving from the low frequency components of said combined signal a component significant of said green color signal for application to said transforming means, means for combining said high frequency components of said combined signal with the white content signal developed by said transforming means to form a modified white content signal, four image developing means, circuits for energizing said image developing means each by a different one of said four electrical signals, and means for registering the images displayed on the several image developing means.

5. In color television apparatus, the invention as recited in claim 4, in combination with compensating means for deriving from said modified white content signal control voltage pulses for reducing the magnitudes of said color residue signals when the high frequency component of said modified white content signal has a negative value.

6. In color television apparatus, the invention as recited in claim 5, wherein said compensating means includes a rectifier upon which said modified white content signal is impressed, said rectifier being polarized for conduction of impressed voltage of negative potential.

7. In color television apparatus, the invention as recited in claim 6, in combination with a low pass filter between said rectifier and said energizing circuits to broaden out the control voltage pulses passed by said rectifier.

8. In color television apparatus, the invention as recited in claim 7, wherein said compensating means includes delay means in the energizing circuits of said color residue signals to delay the transmission of the same by a time interval equal to the delay of said control voltage pulses in said rectifier and said low pass filter.

9. In color television apparatus, the invention as recited in claim 8, wherein said compensating means includes delay means in the energizing circuit of said modified white content signal, whereby the signals impressed upon said image developing means at any instant correspond substantially to the same image point.

10. In color television apparatus, a transmitter including means for developing three original color significant signals corresponding to the relative magnitudes of the three fundamental reproduction colors of each image element, means at said transmitter for transforming the said three original signals prior to transmission into four electrical signals comprising a white content signal of an instantaneous magnitude substantially equal to that of the minimum amplitude original signal and three color residue signals of instantaneous magnitude equal respectively to the amplitudes of said original signals less than the instantaneous magnitude of said white content signal, said signal representing said white content signal covering a frequency band considerably larger than the frequency bands of said signals representing said three color residue signals; and a receiver, said receiver having four image developing means, circuits for energizing said image developing means each by a different one of said four electrical signals, and means for registering the images displayed on said image developing means.

References Cited in the file of this patent

UNITED STATES PATENTS

| | | |
|---|---|---|
| 2,558,489 | Kalfaian | June 26, 1951 |
| 2,567,040 | Sziklai | Sept. 4, 1951 |